US009360295B2

(12) United States Patent
Taniguchi et al.

(10) Patent No.: US 9,360,295 B2
(45) Date of Patent: Jun. 7, 2016

(54) ROTATIONAL POSITION SENSING APPARATUS (71) Applicants: DENSO CORPORATION, Kariya, Aichi-pref. (JP); ASMO CO., LTD., Kosai, Shizuoka-pref. (JP)

(72) Inventors: Makoto Taniguchi, Obu (JP); Takeshi Wakana, Kosai (JP); Hiroshi Imai, Toyohashi (JP); Masahiro Goto, Kosai (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 327 days.

(21) Appl. No.: 13/919,316

(22) Filed: Jun. 17, 2013

(65) Prior Publication Data

US 2014/0070799 A1    Mar. 13, 2014

(30) Foreign Application Priority Data

Sep. 12, 2012 (JP) ................................. 2012-200610

(51) Int. Cl.
*G01B 7/30* (2006.01)
*G01D 5/00* (2006.01)
*G01D 5/14* (2006.01)
*G01D 11/30* (2006.01)

(52) U.S. Cl.
CPC .. *G01B 7/30* (2013.01); *G01D 5/00* (2013.01); *G01D 5/145* (2013.01); *G01D 11/30* (2013.01)

(58) Field of Classification Search
CPC ....... G01D 5/145; G01D 11/245; G01P 3/487
See application file for complete search history.

(56) References Cited

U.S. PATENT DOCUMENTS

| 5,264,749 | A  | * | 11/1993 | Maeda | .................. | H02K 1/12 29/607 |
| 6,541,959 | B2 | * | 4/2003 | Gudgeon | ................ | G01P 3/488 123/617 |
| 8,872,396 | B2 | * | 10/2014 | Sakata | .................. | H02K 1/278 310/156.12 |
| 2004/0084980 | A1 | | 5/2004 | Yamaguchi et al. | | |
| 2005/0018363 | A1 | * | 1/2005 | Hasegawa | .............. | B82Y 25/00 360/324.1 |

(Continued)

FOREIGN PATENT DOCUMENTS

| DE | 102008040318 | 1/2010 |
| JP | S61-195803 | 12/1986 |

(Continued)

OTHER PUBLICATIONS

Office Action (6 pages) dated Jul. 3, 2015, issued in corresponding Chinese Application No. 201310415166.5 and English translation (8 pages).

(Continued)

*Primary Examiner* — Tung X Nguyen
*Assistant Examiner* — Dominic Hawkins
(74) *Attorney, Agent, or Firm* — Nixon & Vanderhye P.C.

(57) ABSTRACT

A rotational position sensing apparatus includes a rotational position sensing magnet and a fixing member. The fixing member is made of a non-magnetic material and is fixed to a rotatable shaft of a rotor. The fixing member includes a plurality of projections, which radially inwardly project and are arranged one after another in a circumferential direction at an inner peripheral surface of a first peripheral wall portion within a space, which is defined by the first peripheral wall portion and a bottom wall portion and holds the rotational position sensing magnet.

15 Claims, 4 Drawing Sheets

(56) References Cited

U.S. PATENT DOCUMENTS

| | | | | |
|---|---|---|---|---|
| 2006/0022537 | A1 | 2/2006 | Yamaguchi et al. | |
| 2007/0090827 | A1* | 4/2007 | Jarrard | G01D 5/145 324/207.2 |
| 2007/0176506 | A1* | 8/2007 | Miekka | H02K 1/17 310/154.07 |
| 2007/0182269 | A1* | 8/2007 | Takahashi | H02K 5/148 310/216.023 |
| 2009/0046442 | A1* | 2/2009 | Mills | H05K 9/006 361/818 |
| 2010/0001721 | A1* | 1/2010 | Inotsuka | G01D 5/145 324/207.25 |
| 2011/0080162 | A1* | 4/2011 | Steinich | G01B 7/30 324/207.25 |
| 2011/0291498 | A1* | 12/2011 | Sakata | H02K 1/278 310/43 |

FOREIGN PATENT DOCUMENTS

| | | |
|---|---|---|
| JP | H11-215766 | 8/1999 |
| JP | 2010-004582 | 1/2010 |
| JP | 2012-005260 | 1/2012 |

OTHER PUBLICATIONS

Japanese Patent Office, "Notification of Reason(s) for Refusal," (3 pages) issued in connection with Japanese Patent Application No. 2012-200610, dated Aug. 18, 2015, with its English language Translation (4 pages).

* cited by examiner

ROTATIONAL POSITION SENSING APPARATUS

CROSS REFERENCE TO RELATED APPLICATION

This application is based on and incorporates herein by reference Japanese Patent Application No. 2012-200610 filed on Sep. 12, 2012.

TECHNICAL FIELD

The present disclosure relates to a rotational position sensing apparatus.

BACKGROUND

For example, DE102008040318A1 teaches a rotational position sensing apparatus, which senses a rotational position of a rotatable body, more specifically a rotational position of a rotor of an electric motor.

This rotational position sensing apparatus includes a rotational position sensing magnet, a fixing member and a magnetic sensor. The rotational position sensing magnet generates a magnetic flux, which is used for sensing the rotational position of the rotor with the magnetic sensor. The fixing member holds the rotational position sensing magnet and is configured into a cylindrical cup form. The fixing member is fixed to an inner race of a bearing that rotatably supports the rotor. The fixing member includes a peripheral wall portion, a bottom wall portion and a projection (a ridge). The peripheral wall portion is configured into a cylindrical tubular form and defines a space, in which the rotational position sensing magnet is held. The bottom wall portion is configured into an annular form and radially inwardly projects from an axial end part of the peripheral wall portion. The bottom wall portion cooperates with the peripheral wall portion to define the space, in which the rotational position sensing magnet is held. The projection limits detachment of the rotational position sensing magnet from the fixing member. The projection circumferentially extends along an inner peripheral surface of the peripheral wall portion all around the inner peripheral surface. Furthermore, the projection radially inwardly projects from the inner peripheral surface of the peripheral wall portion. The rotational position sensing magnet is formed in the space, which is defined by the peripheral wall portion and the bottom wall portion. The magnetic sensor is placed at a corresponding location, which is axially opposed to an axial end surface of the rotational position sensing magnet.

A method of forming the projection along the inner peripheral surface of the peripheral wall portion all around the inner peripheral surface may include a press working process. In the case where the projection is formed by the press working process, since the projection circumferentially extends along the inner peripheral surface of the peripheral wall portion all around the inner peripheral surface, the peripheral wall portion needs to be separately formed from the bottom wall portion in order to install and remove the peripheral wall portion relative to a press-working die. In this case, after the forming of the projection along the inner peripheral surface of the peripheral wall portion through the press-working process, the bottom wall portion needs to be joined to an axial end part of the peripheral wall portion. Therefore, the number of the manufacturing steps is increased, thereby resulting in an increase in the manufacturing costs.

A method of forming the projection along the inner peripheral surface of the peripheral wall portion all around the inner peripheral surface without the need for the separating of the peripheral wall portion from the bottom wall portion may include a machining process (cutting/scraping, which involves removal of a material) or a hydroforming process. However, in the case where the projection is formed in the fixing member through the machining process, the processing time is relatively long, and thereby the fixing member cannot be formed at low costs. Furthermore, in the case where the projection is formed in the fixing member through the hydroforming process, an advanced forming technology is required, and thereby the fixing member cannot be formed at the low costs.

SUMMARY

The present disclosure is made in view of the above points. According to the present disclosure, there is provided a rotational position sensing apparatus, which includes a rotational position sensing magnet and a fixing member. The rotational position sensing magnet generates a magnetic flux that is used for sensing a rotational position of a rotatable body. The fixing member is made of a non-magnetic material and is fixed to a rotatable shaft of the rotatable body. The fixing member includes a first peripheral wall portion, which is configured into a tubular form, and a bottom wall portion, which radially inwardly extends from one axial end part of the first peripheral wall portion. The rotational position sensing magnet is held in a space, which is defined by the first peripheral wall portion and the bottom wall portion. The fixing member includes a plurality of projections, which radially inwardly project and are arranged one after another in a circumferential direction at an inner peripheral surface of the first peripheral wall portion within the space, which is defined by the first peripheral wall portion and the bottom wall portion and holds the rotational position sensing magnet.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described. In the present embodiment, a rotational position sensing apparatus of the present disclosure is applied to an electric motor of an electric power steering apparatus installed in a vehicle (e.g., an automobile).

First of all, a structure of the electric motor of the present embodiment will be described with reference to FIGS. 1 to 6.

Figure 1:
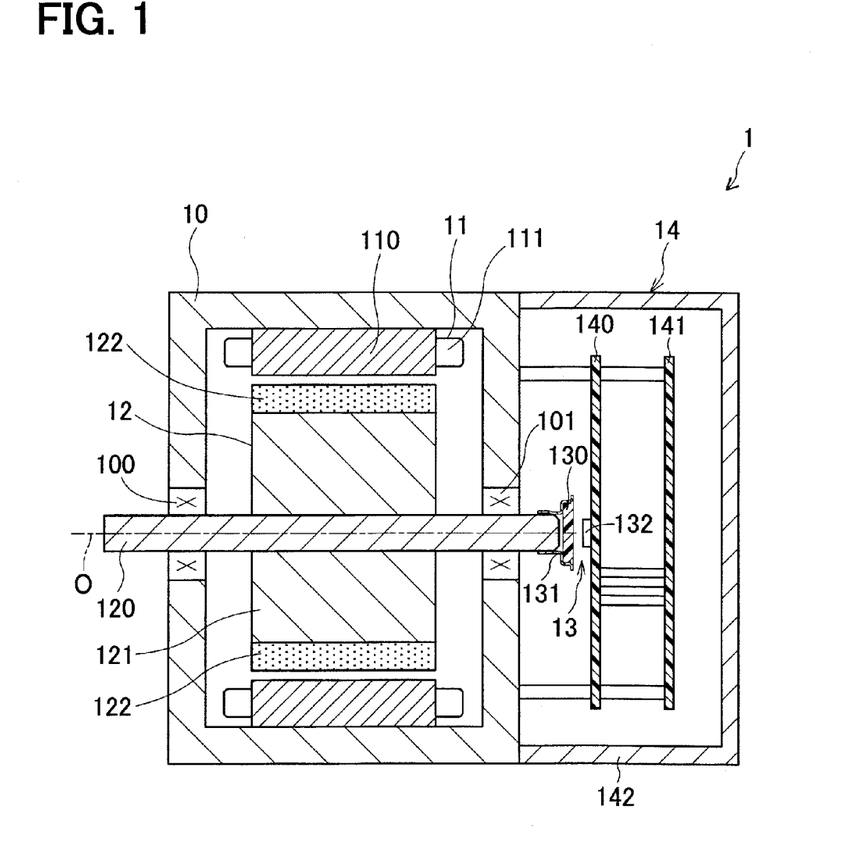
FIG. 1 is an axial cross-sectional view of an electric motor according to an embodiment of the present disclosure.

As shown in FIG. 1, the electric motor 1, which serves as a dynamo-electric machine of the present disclosure, includes a housing 10, a stator 11, a rotor (serving as a rotatable body) 12, a rotational position sensing apparatus 13 and a control device 14. In general, the dynamo-electric machine is defined as an apparatus for converting mechanical energy into electrical energy or vice versa. Therefore, although the dynamo-electric machine of the present disclosure is implemented as the electric motor in this embodiment, the dynamo-electric machine of the present disclosure may be implemented as any one of the electric motor, a generator and a motor-generator.

The housing 10 receives the stator 11 and the rotor 12 and rotatably supports the rotor 12. Two bearings 100, 101 are installed in the housing 10.

The stator 11 forms a part of a magnetic path (a magnetic circuit) and generates a rotating magnetic field when a predetermined electric current is supplied to the stator 11. The stator 11 includes a stator core 110 and stator windings 111.

The stator core 110 forms the part of the magnetic path (the magnetic circuit) and holds the stator windings 111. The stator core 110 is configured into a cylindrical tubular form and is made of a magnetic metal material. The stator core 110 includes a plurality of slots. The slots axially extend through the stator core 110 and are arranged one after another in the circumferential direction. The stator core 110 is fixed to an inner peripheral surface of the housing 10.

When the predetermined electric current is supplied to the stator windings 111, the rotating magnetic field is generated. The stator windings 111 are received and held in the slots of the stator core 110.

The rotor 12 forms a part of the magnetic path (the magnetic circuit) and generates a magnetic flux. The rotor 12 generates a rotational force in the presence of the rotating magnetic field generated from the stator 11. The rotor 12 includes a rotatable shaft 120, a rotor core 121 and permanent magnets 122.

The rotatable shaft 120 is configured into a cylindrical form (more specifically, a cylindrical rod form) and is made of a non-magnetic metal material. The rotatable shaft 120 is rotatably supported by the housing 10 through the bearings 100, 101.

The rotor core 121 forms the part of the magnetic path (the magnetic circuit) and holds the permanent magnets 122. The rotor core 121 is configured into a cylindrical form and is made of a magnetic metal material. The rotor core 121 is fixed to the rotatable shaft 120 and is rotatably supported by the housing 10 such that an outer peripheral surface of the rotor core 121 is radially opposed to an inner peripheral surface of the stator core 110.

The permanent magnets 122 are configured into an arcuate plate form and generate a magnetic flux to generate the rotational force. The permanent magnets 122 are fixed to the outer peripheral surface of the rotor core 121.

The rotational position sensing apparatus 13 is an apparatus that senses a rotational position of the rotor 12. The rotational position sensing apparatus 13 includes a rotational position sensing magnet 130, a fixing member (also referred to as a fixing element) 131 and a magnetic sensor 132.

The rotational position sensing magnet 130 is configured into a circular disk plate form and generates a magnetic flux that is used for sensing the rotational position of the rotor 12 with the magnetic sensor 132. Specifically, the rotational position sensing magnet 130 is a bonded magnet, which includes, i.e., contains a resin material and a magnetic material (e.g., magnetic powder, magnetic particles).

Figure 2:
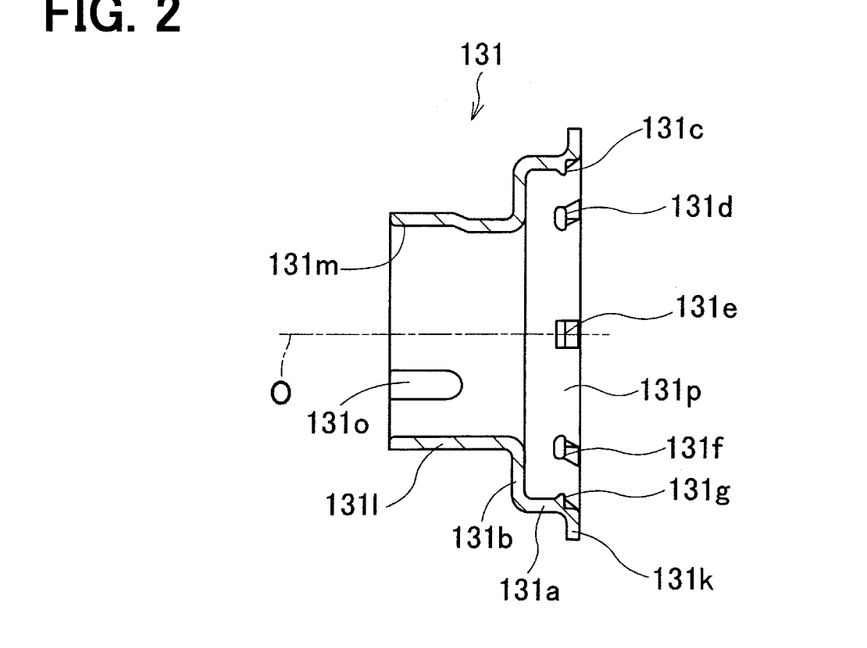
FIG. 2 is an axial cross-sectional view of a fixing member shown in FIG. 1.
Figure 3:
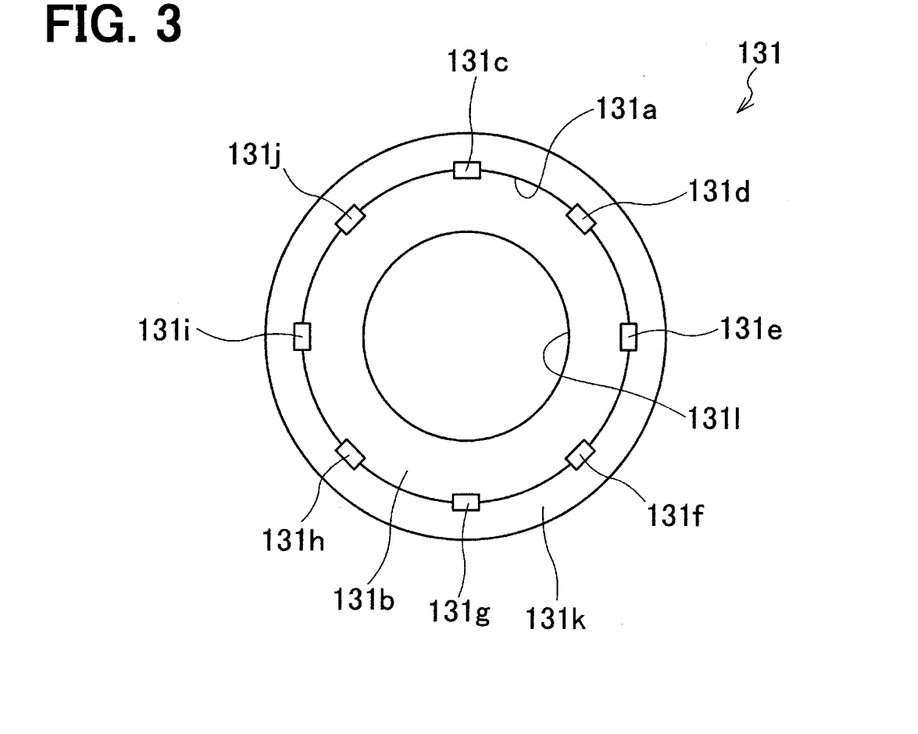
FIG. 3 is a side view of the fixing member taken from a flange portion side in FIG. 2.
Figure 4:
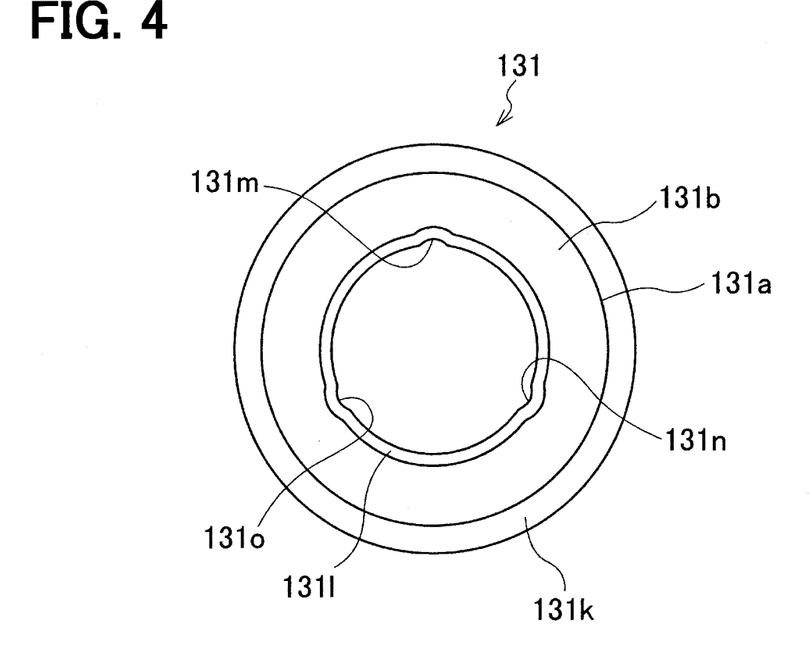
FIG. 4 is a side view of the fixing member taken from a second peripheral wall portion side in FIG. 2.

The fixing member 131 is configured into a cylindrical tubular form and is made of a non-magnetic metal material. The fixing member 131 is seamlessly and integrally formed from the non-magnetic metal material as a single integral component (one integral component). The fixing member 131 holds the rotational position sensing magnet 130 and is fixed to the rotatable shaft 120 of the rotor 12. As shown in FIGS. 2 to 4, the fixing member 131 includes a first peripheral wall portion 131a, a bottom wall portion 131b, a plurality of projections 131c-131j, a flange portion 131k and a second peripheral wall portion 131l.

The first peripheral wall portion 131a is configured into a cylindrical tubular form, which defines a space 131p therein. The space 131p holds the rotational position sensing magnet 130.

The bottom wall portion 131b is configured into an annular form (a ring form). The bottom wall portion 131b radially inwardly extends from one axial end part of the first peripheral wall portion 131a. The bottom wall portion 131b defines the space 131p in cooperation with the first peripheral wall portion 131a to hold the rotational position sensing magnet 130 in the space 131p.

The projections 131c-131j are provided to limit detachment of the rotational position sensing magnet 130 from the fixing member 131. The projections 131c-131j radially inwardly project at an inner peripheral surface of the first peripheral wall portion 131a. The projections 131c-131j are spaced from each other and are arranged one after another in a circumferential direction at the inner peripheral surface of the first peripheral wall portion 131a. More specifically, the projections 131c-131j are arranged one after another at generally equal intervals in the circumferential direction in the inner peripheral surface of the first peripheral wall portion 131a at a corresponding axial location, which is axially spaced from the bottom wall portion 131b. Further specifically, the projections (eight projections in this instance) 131c-131j are arranged one after another at about 45 degree intervals in the circumferential direction. Each of the projections 131c-131j is formed by compressing (i.e., a compressing operation) of a corresponding portion of the inner peripheral surface of the first peripheral wall portion 131a through a press working process. Specifically, the corresponding portion of the inner peripheral surface of the first peripheral wall portion 131a is partially compressed in the axial direction from the flange portion 131k side toward the second peripheral wall portion 131l side by a corresponding die or tool, so that the corresponding portion of the inner peripheral surface of the first peripheral wall portion 131a radially inwardly projects toward a central axis O. Therefore, in the present embodiment, the projections 131c-131j are formed as axially compressed projections, which are axially compressed to radially inwardly project from the inner peripheral surface of the first peripheral wall portion 131a.

The flange portion 131k is configured into an annular form (a ring form) and radially outwardly projects from the other axial end part of the first peripheral wall portion 131a, which is axially opposite from the one axial end part of the first peripheral wall portion 131a and the bottom wall portion 131b.

The second peripheral wall portion 131l is configured into a cylindrical tubular form and extends from an axial side of the bottom wall portion 131b, which is opposite from the first peripheral wall portion 131a. The second peripheral wall portion 131l is generally coaxial with the first peripheral wall portion 131a. The second peripheral wall portion 131l is fitted to the rotatable shaft 120 of the rotor 12. A wall thickness (a plate wall thickness) of the second peripheral wall portion 131*l* is generally equal to a wall thickness of the first peripheral wall portion 131*a*. Furthermore, in this particular instance, a wall thickness of the fixing member 131 is generally uniform throughout the fixing member 131, as shown in FIG. 2. That is, a wall thickness of the bottom wall portion 131*b*, a wall thickness of the flange portion 131*k*, the wall thickness of the first peripheral wall portion 131*a* and the wall thickness of the second peripheral wall portion 131*l* are generally equal to each other. The second peripheral wall portion 131*l* includes a plurality of bulged portions 131*m*-131*o*.

The bulged portions 131*m*-131*o* are spaced from each other and are arranged one after another in the circumferential direction in the second peripheral wall portion 131I. Each bulged portion 131*m*-131*o* forms a radial gap G between the bulged portion 131*m*-131*o* and the rotatable shaft 120. Each bulged portion 131*m*-131*o* axially extends from one axial end of the second peripheral wall portion 131*l*, which is axially opposite from the bottom wall portion 131*b*, to an axial center part of the second peripheral wall portion 131*l*.

Figure 5:
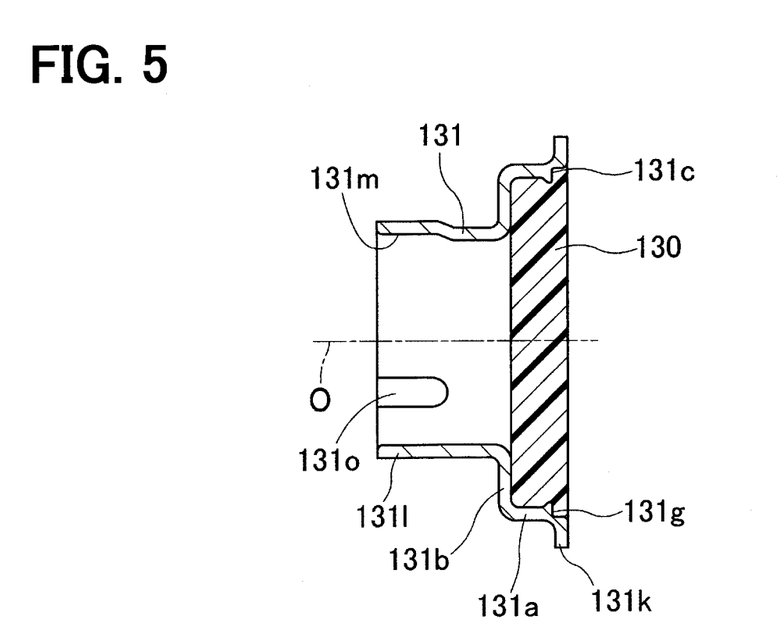
FIG. 5 is an axial cross-sectional view of the fixing member of the embodiment, which holds a rotational position sensing magnet.
Figure 6:
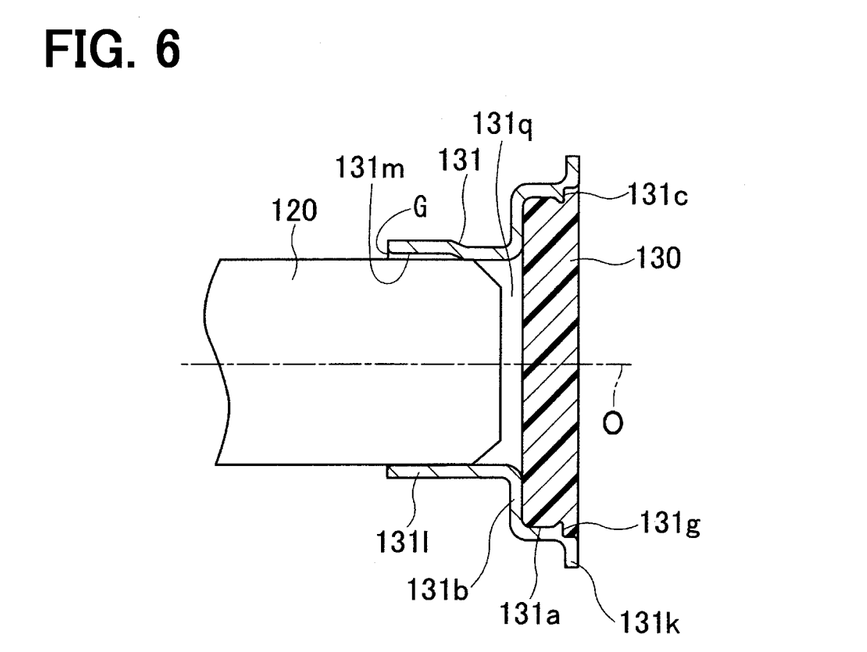
FIG. 6 is an axial cross-sectional view of the fixing member of the embodiment, which is fitted to a rotatable shaft and holds the rotational position sensing magnet.

The fixing member 131 is annealed after each corresponding part of the fixing member 131 described above is shaped (configured), i.e., after metal forming of the fixing member 131. Thereafter, as shown in FIG. 5, the rotational position sensing magnet 130 is formed by injection molding in the space 131*p*, which is defined by the first peripheral wall portion 131*a* and the bottom wall portion 131*b* of the fixing member 131, so that the projections 131*c*-131*j* are insert molded into the rotational position sensing magnet 130. Then, as shown in FIG. 6, the second peripheral wall portion 131*l* is fitted to an axial end portion of the rotatable shaft 120. At that time, the air in a space 131*q*, which is defined by the second peripheral wall portion 131*l*, the rotational position sensing magnet 130 and the rotatable shaft 120, is compressed, so that a stress may possibly be applied to the rotational position sensing magnet 130. However, the air in this space 131*q* is advantageously expelled from the space 131*q* through the bulged portions 131*m*-131*o* (more specifically, the radial gaps G), so that the stress, which is applied to the rotational position sensing magnet 130, can be limited or alleviated.

The magnetic sensor 132 of FIG. 1 is an element, which senses the magnetic flux generated from the rotational position sensing magnet 130. The magnetic sensor 132 is placed at a position, which is axially opposed to an axial end surface of the rotational position sensing magnet 130.

The control device 14 controls the electric current, which flows through the stator windings 111, based on a sensed result of the rotational position sensing apparatus 13 to exert the rotational force at the rotatable shaft 120. The control device 14 includes a control circuit board 140, a drive circuit board 141 and a cover 142.

The control circuit board 140 is a circuit board that has a control circuit, which includes a microcomputer. The control circuit of the control circuit board 140 generates a control signal based on the sensed result of the rotational position sensing apparatus 13. The control circuit board 140 is axially spaced from the rotational position sensing magnet 130 and is fixed to the housing 10 with bolts. The magnetic sensor 132 is installed to a surface of the control circuit board 140, which is opposed to the rotational position sensing magnet 130, such that the magnetic sensor 132 is placed at a corresponding location that is opposed to the axial end surface of the rotational position sensing magnet 130.

The drive circuit board 141 is a circuit board that has a drive circuit, which includes power transistors. The drive circuit of the drive circuit board 141 controls the electric current, which flows in the stator windings 111, based on the control signal generated from the control circuit board 140. The drive circuit board 141 is axially spaced from the control circuit board 140 and is fixed to the control circuit board 140 with bolts. Furthermore, the drive circuit board 141 is connected to the control circuit board 140 through a connector.

The cover 142 is configured into a cup shape form and covers the control circuit board 140 and the drive circuit board 141. The cover 142 is fixed to the housing 10 in a state where the cover 142 covers the control circuit board 140 and the drive circuit board 141.

Next, advantages of the present embodiment will be described.

According to the present embodiment, the fixing member 131 includes the projections 131*c*-131*j* formed in the inner peripheral surface of the first peripheral wall portion 131*a* within the space 131*p*, which is defined by the first peripheral wall portion 131*a* and the bottom wall portion 131*b* and holds the rotational position sensing magnet 130. The projections 131*c*-131*j* are formed in the inner peripheral surface of the first peripheral wall portion 131*a* such that the projections 131*c*-131*j* are spaced from each other and are arranged one after another in the circumferential direction. Therefore, at the time of forming each of the projections 131*c*-131*j* by the compressing of the corresponding portion of the inner peripheral surface of the first peripheral wall portion 131*a* through the press working process, it is possible to install and remove the fixing member 131 to a corresponding die through use of circumferential gaps, each of which is formed by the corresponding adjacent two of the projections 131*c*-131*j*. Therefore, the projections 131*c*-131*j* can be formed without requiring separation of the first peripheral wall portion 131*a* from the rest of the fixing member 131 (i.e., the bottom wall portion 131*b* and the second peripheral wall portion 131*l*). The process of forming of the projections 131*c*-131*j* of the present embodiment does not require the use of the machining process (cutting/scraping, which involves removal of the metal material) or the hydroforming process, which causes an increase in the manufacturing costs. Thereby, in the rotational position sensing apparatus 13, which senses the rotational position of the rotor 12 of the electric motor 1, the fixing member 131, which holds the rotational position sensing magnet 130, can be manufactured at low costs.

According to the present embodiment, the projections 131*c*-131*j* are formed in the inner peripheral surface of the first peripheral wall portion 131*a* at the corresponding axial location, which is axially spaced from the bottom wall portion 131*b*. Therefore, in the case where each of the projections 131*c*-131*j* is formed through the compressing of the corresponding portion of the inner peripheral surface of the first peripheral wall portion 131*a* through the press working process, the corresponding die can be reliably placed at the bottom wall portion side of the corresponding axial location, at which the projections 131*c*-131*j* are formed. Therefore, the projections 131*c*-131*j* can be reliably formed.

According to the present embodiment, the projections 131*c*-131*j* are formed in the inner peripheral surface of the first peripheral wall portion 131*a* such that the projections 131*c*-131*j* are arranged one after another at generally equal intervals in the circumferential direction. Therefore, the stress, which is applied to the rotational position sensing magnet 130, can be generally uniformly spread over the rotational position sensing magnet 130 in the circumferential direction. As a result, it is possible to limit occurrence of a damage of the rotational position sensing magnet 130 caused by stress concentration.

According to the present embodiment, the fixing member 131 is made of the metal material, and each of the projections 131c-131j is formed in the inner peripheral surface of the first peripheral wall portion 131a through the compressing of the corresponding portion of the inner peripheral surface of the first peripheral wall portion 131a through the press working process. Thereby, the fixing member 131 can be manufactured at the low costs.

In the present embodiment, the fixing member 131 includes the second peripheral wall portion 131l, which is configured into the tubular form and is fitted to the rotatable shaft 120 of the rotor 12. At the time of fitting the second peripheral wall portion 131l to the axial end portion of the rotatable shaft 120, the air in the space 131q, which is defined by the second peripheral wall portion 131l, the rotational position sensing magnet 130 and the rotatable shaft 120, is compressed, so that the stress may possibly be applied to the rotational position sensing magnet 130. However, the bulged portions 131m-131o are formed in the second peripheral wall portion 131l at the three circumferential locations, respectively, and each of the bulged portions 131m-131o forms the radial gap G between the bulged portion 131m-131o and the rotatable shaft 120. Therefore, the air in this space 131q can be expelled from the space 131q through the bulged portions 131m-131o (more specifically, through the radial gaps G) at the time of fitting the second peripheral wall portion 131l to the axial end portion of the rotatable shaft 120. Thus, the stress, which is applied to the rotational position sensing magnet 130, can be limited or alleviated.

In the present embodiment, the fixing member 131 includes the flange portion 131k, which is configured into the annular form and radially outwardly projects from the other axial end part of the first peripheral wall portion 131a, which is axially opposite from the bottom wall portion 131b. Therefore, the strength (or rigidity) of the first peripheral wall portion 131a can be increased. As a result, it is possible to limit the deformation of the first peripheral wall portion 131a caused by the forming of the projections 131c-131j and/or the injection molding of the rotational position sensing magnet 130.

According to the present embodiment, the fixing member 131 is made of the metal material and is annealed after the shaping (the metal forming) of the fixing member 131. Thereby, it is possible to remove the residual stress caused by the shaping of each corresponding part of the fixing member 131. Thus, for example, cracking of the fixing member 131 during the use of the electric motor 1 can be limited.

According to the present embodiment, the rotational position sensing magnet 130 is the bonded magnet, which includes the resin material and is formed by the injection molding in the space 131p that is defined by the first peripheral wall portion 131a and the bottom wall portion 131b. Therefore, the projections 131c-131j can reliably bite, i.e., can reliably hold the rotational position sensing magnet 130. Thus, the detachment of the rotational position sensing magnet 130 from the fixing member 131 can be reliably limited.

Now, modifications of the above embodiment will be described.

Figure 7:
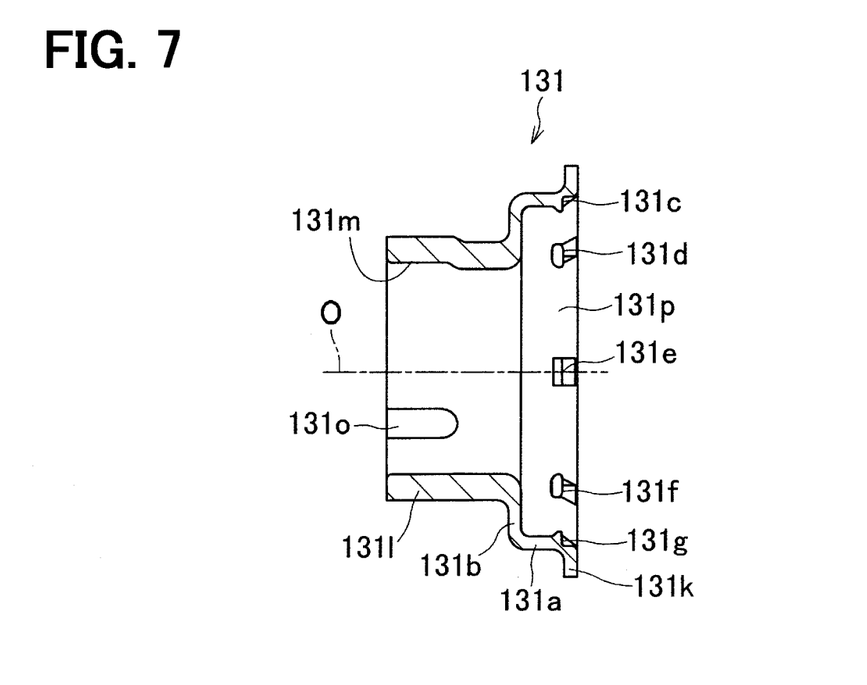
FIG. 7 is an axial cross-sectional view of a modification of the fixing member of the embodiment.

In the above-described embodiment, the wall thickness of the second peripheral wall portion 131l is generally the same as the wall thickness of the first peripheral wall portion 131a. However, the present disclosure is not limited to this construction. Specifically, as shown in FIG. 7, the wall thickness of the second peripheral wall portion 131l may be set to be larger than the wall thickness of the first peripheral wall portion 131a. In such a case, it is possible to increase the fitting strength of the fixing member 131 against the rotatable shaft 120.

Furthermore, in the above-described embodiment, each of the projections 131c-131j is formed by the compressing (the compressing operation) of the corresponding portion of the inner peripheral surface of the first peripheral wall portion 131a through the press working process. However, the method of forming the projections 131c-131j is not limited to this method. For example, each of the projections 131c-131j may be a bent projection that is formed by partially cutting (or slicing or skiving) and radially inward bending the corresponding portion of the inner peripheral surface of the first peripheral wall portion 131a in a form of a fin or flap (skived fin or flap) that radially inwardly projecting from the inner peripheral surface. Even in such a case, the fixing member 131 can be manufactured at low costs.

In the above-described embodiment, the fixing member 131 includes the eight projections 131c-131j. However, the number of the projections 131c-131j is not limited to eight. That is, it is only required to have more than one projections (i.e., the plurality of projections) 131c-131j.

In addition, in the above-described embodiment, the three bulged portions 131m-131o are formed at the three circumferential locations, respectively, in the second peripheral wall portion 131l. However, the number of the bulged portions 131m-131o is not limited to three. That is, it is only required to have at least one bulged portion (i.e., one or more bulged portions) 131m-131o in the second peripheral wall portion 131l.

Additional advantages and modifications will readily occur to those skilled in the art. The present disclosure in its broader terms is therefore not limited to the specific details, representative apparatus, and illustrative examples shown and described.

What is claimed is:

1. A rotational position sensing apparatus comprising:
   a rotational position sensing magnet that generates a magnetic flux that is used for sensing a rotational position of a rotatable body; and
   a fixing member that is made of a non-magnetic material and is fixed to a rotatable shaft of the rotatable body to rotate integrally with the rotatable shaft, wherein:
   the fixing member includes a first peripheral wall portion, which is configured into a tubular form, and a bottom wall portion, which radially inwardly extends from one axial end part of the first peripheral wall portion;
   the rotational position sensing magnet is held in a space, which is defined by the first peripheral wall portion and the bottom wall portion;
   the fixing member includes a plurality of projections, which radially inwardly project and are arranged one after another in a circumferential direction at an inner peripheral surface of the first peripheral wall portion within the space, which is defined by the first peripheral wall portion and the bottom wall portion and holds the rotational position sensing magnet; and
   each of the plurality of projections is embedded into and is engaged with the rotational position sensing magnet to limit movement of the rotational position sensing magnet relative to the fixing member in both of the circumferential direction and an axial direction.

2. The rotational position sensing apparatus according to claim 1, wherein the plurality of projections is formed in the inner peripheral surface of the first peripheral wall portion at an axial location, which is axially spaced from the bottom wall portion.

3. The rotational position sensing apparatus according to claim 1, wherein the plurality of projections is arranged one after another at generally equal intervals in the circumferential direction in the inner peripheral surface of the first peripheral wall portion.

4. The rotational position sensing apparatus according to claim 1, wherein:
the non-magnetic material of the fixing member is a non-magnetic metal material; and
each of the plurality of projections is formed by compressing a corresponding portion of the inner peripheral surface of the first peripheral wall portion or by partially cutting and radially inward bending the corresponding portion of the inner peripheral surface of the first peripheral wall portion.

5. The rotational position sensing apparatus according to claim 1, wherein:
the fixing member includes a second peripheral wall portion, which is configured into a tubular form and is fitted to the rotatable shaft of the rotatable body; and
the second peripheral wall portion includes at least one bulged portion, which forms a radial gap between the at least one bulged portion and the rotatable shaft.

6. The rotational position sensing apparatus according to claim 5, wherein the second peripheral wall portion has a wall thickness, which is larger than a wall thickness of the first peripheral wall portion.

7. The rotational position sensing apparatus according to claim 1, wherein the fixing member includes a flange portion, which is configured into an annular form and radially outwardly projects from the other axial end part of the first peripheral wall portion, which is axially opposite from the one axial end part of the first peripheral wall portion and the bottom wall portion.

8. The rotational position sensing apparatus according to claim 1, wherein:
the non-magnetic material of the fixing member is a non-magnetic metal material; and
the fixing member is annealed after metal forming of the fixing member.

9. The rotational position sensing apparatus according to claim 1, wherein the rotational position sensing magnet is a bonded magnet that includes a resin material and a magnetic material and is injection molded in the space, which is defined by the first peripheral wall portion and the bottom wall portion.

10. The rotational position sensing apparatus according to claim 1, wherein the rotatable body is a rotor of a dynamo-electric machine.

11. The rotational position sensing apparatus according to claim 1, wherein:
the rotational position sensing magnet contains a resin material;
the non-magnetic material of the fixing member is a non-magnetic metal material;
the fixing member is seamlessly and integrally formed from the non-magnetic metal material; and
the plurality of projections is insert molded into the rotational position sensing magnet.

12. The rotational position sensing apparatus according to claim 11, wherein a wall thickness of the fixing member is generally uniform throughout the fixing member.

13. The rotational position sensing apparatus according to claim 11, wherein the plurality of projections is a plurality of axially compressed projections, each of which is axially compressed to radially inwardly project from the inner peripheral surface of the first peripheral wall portion.

14. The rotational position sensing apparatus according to claim 11, wherein the plurality of projections is a plurality of bent projections, each of which is partially cut and radially inwardly bent from the inner peripheral surface of the first peripheral wall portion.

15. The rotational position sensing apparatus according to claim 9, wherein the magnetic material is selected from a group consisting of magnetic powders, magnetic particles and mixtures thereof.

* * * * *